(12) United States Patent
Gomi et al.

(10) Patent No.: US 7,548,690 B2
(45) Date of Patent: Jun. 16, 2009

(54) SHUTTER DEVICE

(75) Inventors: Kazunori Gomi, Nagano (JP); Nobuo Komatsu, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 351 days.

(21) Appl. No.: 11/622,108

(22) Filed: Jan. 11, 2007

(65) Prior Publication Data

US 2008/0025718 A1  Jan. 31, 2008

(30) Foreign Application Priority Data

Jul. 31, 2006  (JP)  ............................. 2006-208080

(51) Int. Cl.
*G03B 35/00* (2006.01)
(52) U.S. Cl. ...................................... 396/326; 396/459
(58) Field of Classification Search ................ 396/324, 396/326, 459, 493, 510, 529; 359/462, 477; 352/57; 353/7, 9
See application file for complete search history.

(56) References Cited

U.S. PATENT DOCUMENTS 2,869,446 A * 1/1959 Franceschini ............... 396/326
3,774,512 A * 11/1973 Seiden et al. ............... 396/333
5,313,239 A   5/1994 Mizukawa
6,269,223 B1 * 7/2001 Lo et al. ..................... 396/326
2006/0147199 A1  7/2006 Kawamoto et al.

FOREIGN PATENT DOCUMENTS

| JP | 5-134331 | 5/1993 |
|----|----------|--------|
| JP | 8-328173 | 12/1996 |
| JP | 2005-62780 | 3/2005 |

* cited by examiner

*Primary Examiner*—Patrick J Assouad
*Assistant Examiner*—Autumn Parker
(74) *Attorney, Agent, or Firm*—Thomas J. Strouse

(57) ABSTRACT

There is provided a shutter device which is used in a camera having two image-capturing optical systems and enables a significant reduction in the number of components. Two shutter openings are formed in a shutter base. Shutter blades and a diaphragm plate are provided forward of the shutter base. When a cam pin is reciprocally moved from the position of a start point to an intermediate position or from the intermediate position to the position of an end point, the shutter blades open and close a shutter one or more times. When the cam pin is located at any position along the way from the start position to the intermediate position, the diaphragm plate is moved to a location where small diaphragm openings correspond to the shutter openings. When the cam pin is located at any position along the way from the intermediate position to the position of the endpoint, the diaphragm plate is moved to a location where open diaphragm openings correspond to the shutter openings.

5 Claims, 11 Drawing Sheets

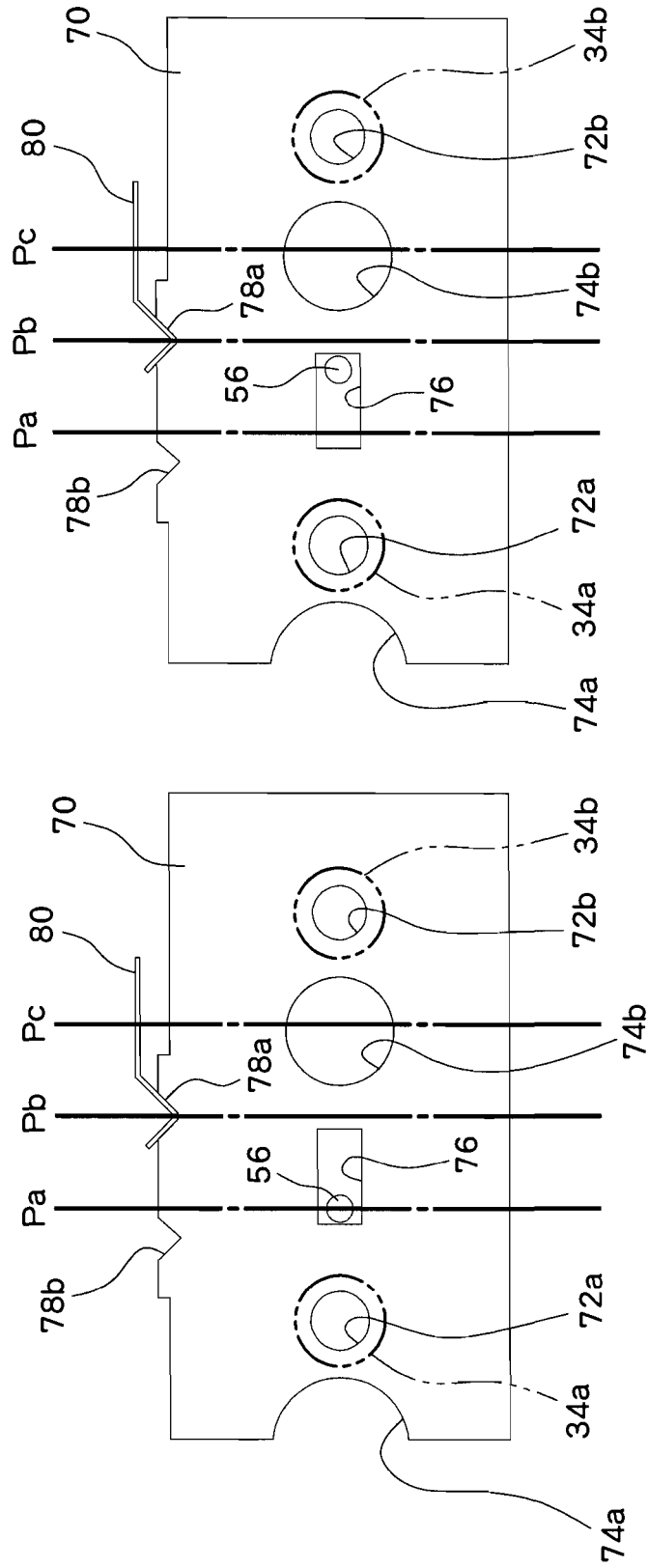

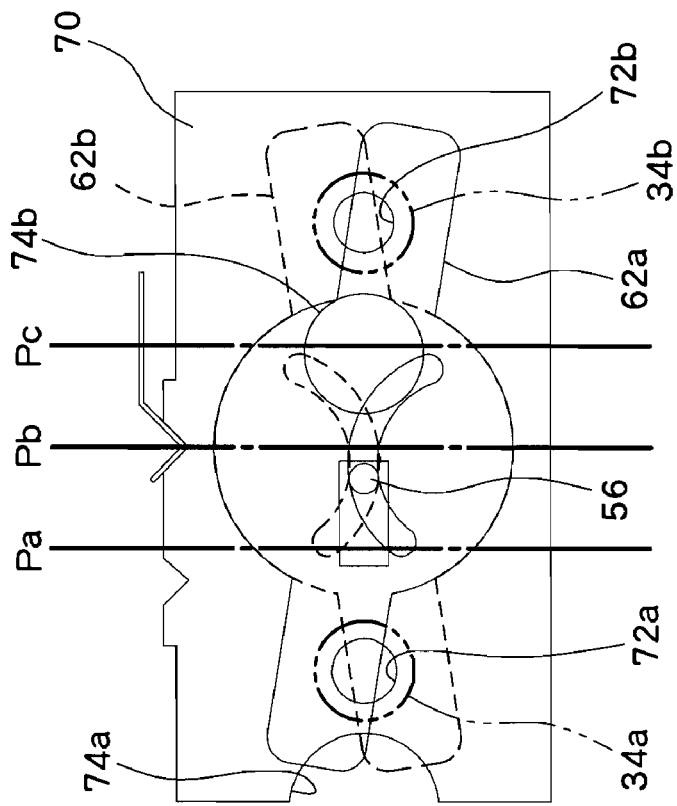
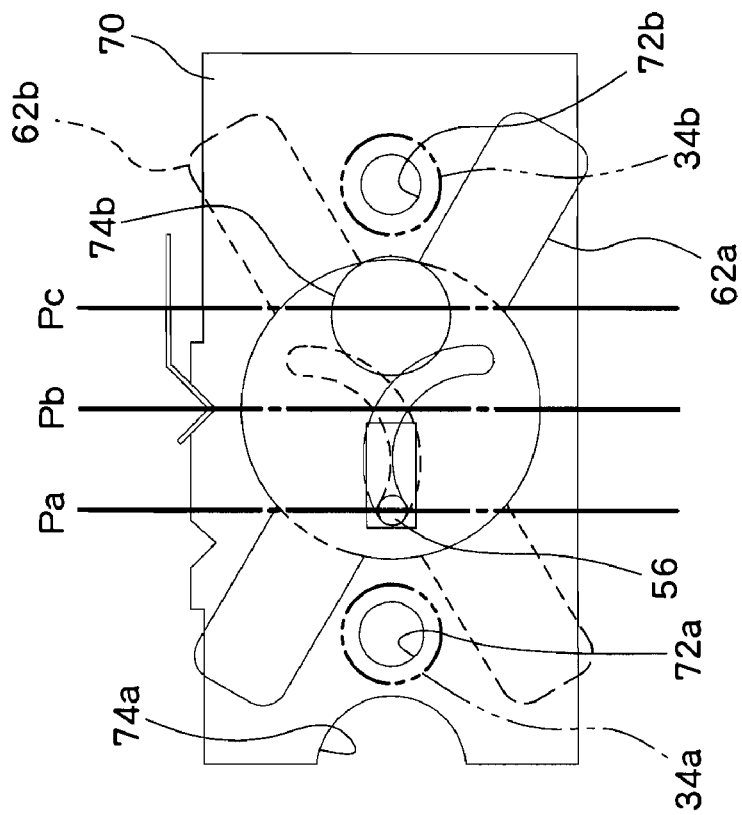
Fig. 10A
Fig. 10B ated hole
SHUTTER DEVICE

CROSS REFERENCE TO RELATED APPLICATIONS

This application claims priority to Japanese Patent Application No. 2006-208080 filed on Jul. 31, 2006, which is incorporated herein by reference in its entirety.

FIELD OF THE INVENTION

The present invention relates to a shutter device used in a camera having two image-capturing optical systems.

BACKGROUND OF THE INVENTION

A camera having a plurality of image-capturing optical systems has recently been put forward. When an image-capturing optical system is provided in numbers, a plurality of shutter mechanisms and diaphragm mechanisms are naturally required. At this time, provision of a shutter mechanism and a diaphragm mechanism for each of the image-capturing optical systems is not desirable, because it results in an increase in the number of components, complicated control, and an increase in the size of the image-capturing device. Accordingly, in the field of a camera having a plurality of image-capturing optical systems, a technique of rendering a shutter mechanism or a diaphragm mechanism common among a plurality of image-capturing optical systems has hitherto been proposed. For instance, Japanese Patent Laid-Open Publication No. Hei 8-328173 describes a technique of controlling apertures of three lenses by means of a single diaphragm member. Japanese Patent Laid-Open Publication No. Hei 5-134331 describes a technique of coupling two shutter blades corresponding to two lenses into a single piece and driving the thus-integrated shutter blades, to thereby open and close shutters of two lenses. According to these techniques, the number of components related to a shutter or a diaphragm in a camera having a plurality of image-capturing optical systems can be reduced.

However, even with these techniques, there is a necessity for individually driving a shutter member and a diaphragm member, and it is difficult to say that the number of components can be effectively curtailed. Japanese Patent Laid-Open Publication No. 2005-62780 describes a technique for rendering a drive mechanism common to a shutter member and a diaphragm member. However, the technique described in Japanese Patent Laid-Open Publication No. 2005-62780 is effectively solely in a case where a single image-capturing optical system is provided, and hardly said to be effective for a camera having a plurality of image-capturing optical systems.

SUMMARY OF THE INVENTION

Accordingly, the present invention provides a shutter device which is used in a camera having two image-capturing optical systems and enables a significant reduction in the number of components.

The present invention provides a shutter device used in a camera having two image-capturing optical systems, the device comprising:

a shutter base having formed therein two shutter openings corresponding to the two image-capturing optical systems;

a shutter member capable of simultaneously opening and closing the two shutter openings;

a diaphragm plate having two open diaphragm openings and two small diaphragm openings formed therein; and a cam pin which can reciprocally travel, upon receipt of driving force from a single motor, along a travel path extending from the position of a start point to the position of an end point via an intermediate position, wherein a shutter cam hole into which the cam pin is to be inserted is formed in the shutter member, and the shutter cam hole defines actuation of the shutter member so as to perform each of opening and closing actions one or more times when the cam pin is reciprocally moved from the start position to the intermediate position and from the intermediate position to the end position; and a diaphragm cam hole into which the cam pin is to be inserted is formed in the diaphragm plate, and the diaphragm cam hole defines actuation of the diaphragm plate such that the two open diaphragm openings are located in front of corresponding shutter openings when the cam pin is located at any location from the start position to the intermediate position, and such that the two small diaphragm openings are located in front of corresponding shutter openings when the cam pin is located at any position from the intermediate position to the end position.

In a preferred mode, the shutter member has a pair of shutter blades which rotate to thus simultaneously open and close the two shutter openings; and the shutter cam hole is formed in each of the shutter blades, and rotates the shutter blade in association with actuation of the cam pin.

In another preferred mode, when the cam pin effects rectilinear translation, the open diaphragm openings and the small diaphragm openings are formed, in the diaphragm plate, adjacent to each other in the direction of movement of the cam pin; and the diaphragm cam hole is an elongated hole which extends in the direction of movement of the cam pin and is slightly shorter than a distance from the start position to the intermediate position or a distance from the intermediate position to the end position. In this case, at least one of the two open diaphragm openings formed in the diaphragm plate is preferably a cutout formed in an end portion of the diaphragm plate.

In yet another preferred mode, the shutter device further comprises a stop position regulatory member which hinders movement of the diaphragm plate upon engagement with a portion of the diaphragm plate and is disengaged from the diaphragm plate by means of elastic deformation upon exposure to an addition of given force or greater; and the diaphragm plate has a section to be engaged which engages with the engagement member when the two open diaphragm openings have moved to positions corresponding to the two shutter openings and the two small diaphragm openings have moved to the positions corresponding to the two shutter openings.

According to the present invention, actuation of a shutter member and a diaphragm plate is implemented by means of a cam pin which travels upon receipt of an output from a single motor. Therefore, there can be realized a significant reduction in the number of components of a shutter device used in a camera having two image-capturing optical systems.

The invention will be more clearly comprehended by reference to the embodiment provided below. However, the scope of the invention is not limited to that embodiment.

BRIEF DESCRIPTION OF THE DRAWINGS

A preferred embodiment of the present invention will be described in detail based on the following figures, wherein:

FIG. 8A is a general front view of the shutter openings and a diaphragm plate when the cam pin is located at the start position;

FIG. 8B is a general front view of the shutter openings and a diaphragm plate when the cam pin is located at the intermediate position;

FIG. 10A is a general front view of the shutter openings, a diaphragm plate, and the pair of shutter blades, when a cam pin is located at the start position;

FIG. 10B is a general front view of the shutter openings, a diaphragm plate, and the pair of shutter blades, when a cam pin is located at the intermediate position;

DETAILED DESCRIPTION OF THE PREFERRED EMBODIMENT

Figure 1:
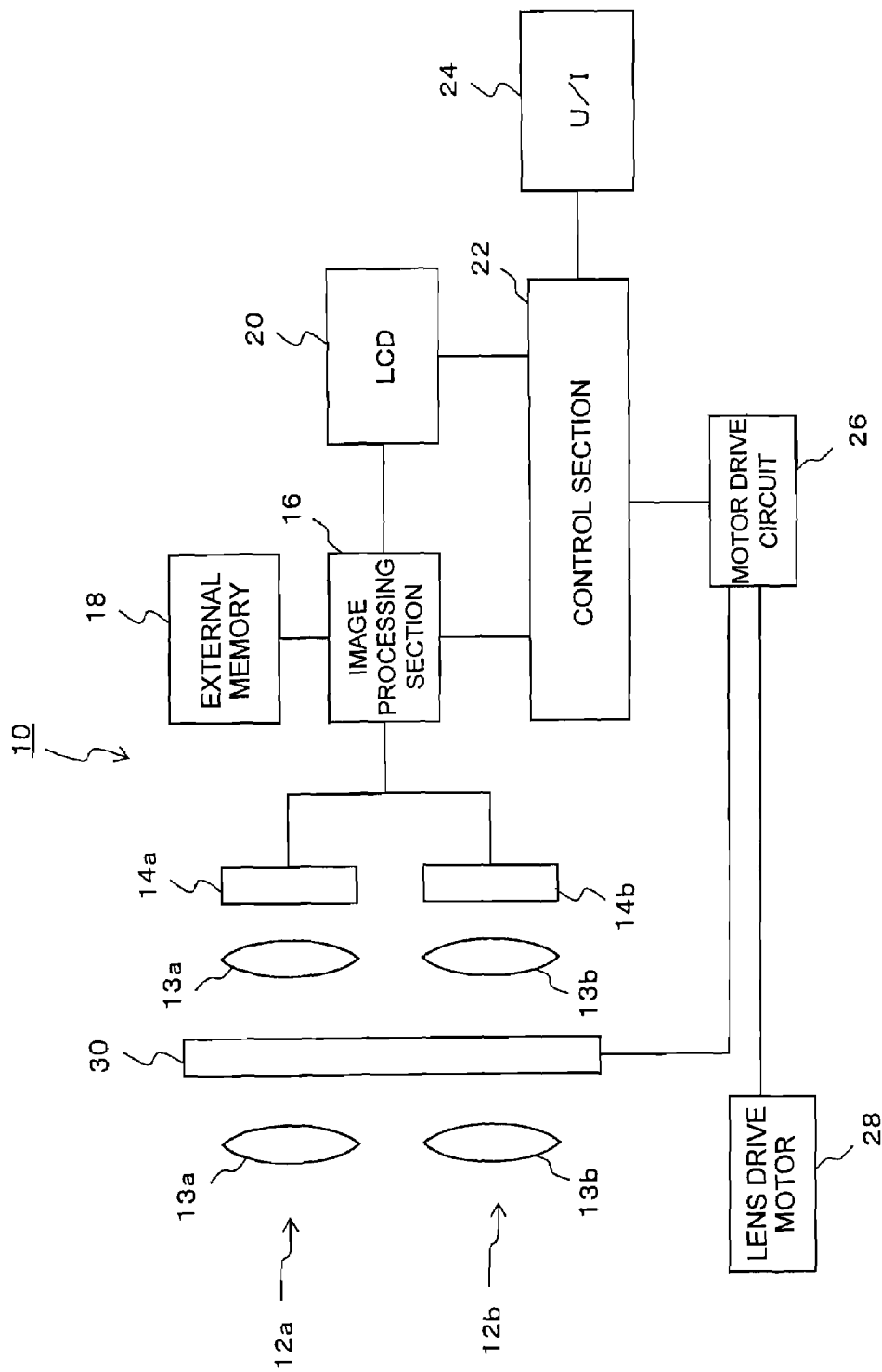
FIG. 1 is a block diagram showing the general configuration of a digital camera corresponding to an embodiment of the present invention.

An embodiment of the present invention will be described hereunder by reference to the drawings. FIG. 1 is a block diagram showing a general configuration of a digital camera 10 corresponding to an embodiment of the present invention. This digital camera 10 has two image-capturing optical systems 12a, 12b arranged along two different optical axes. The image-capturing optical system 12a is provided with a group of lenses 13a, and the image-capturing optical system 12b is provided with a group of lenses 13b. The plurality of lens groups 13a, 13b are actuated along the corresponding optical axes by means of a lens drive motor 28, thereby effecting power-varying operation and focus adjustment operation. The two image-capturing optical systems 12a, 12b are provided with a single shutter device 30. As will be described in detail later, the shutter device 30 is a common unit into which a shutter mechanism and a diaphragm mechanism for each of the two image-capturing optical systems 12a, 12b are assembled. The shutter device 30 performs diaphragm operation and shutter operation by means of a single drive motor (not shown).

Light from a subject (hereinafter called "subject light") condensed by each of the image-capturing optical systems 12a, 12b is subjected to photoelectric conversion performed in each of CCDs 14a, 14b provided in correspondence to the respective image-capturing optical systems 12a, 12b, and the thus-converted light is output as an image signal to an image-processing section 16. The image processing section 16 subjects an acquired image signal to predetermined signal processing; e.g., A/D conversion, pixel addition processing, white balance processing, γ correction processing, JPEG conversion processing, and the like, to thus create image data. The thus-created image data are displayed on an LCD 20 or stored in external memory 18.

Pursuant to a user's command input by way of a user interface 24, a control section 22 controls the entire camera. Specifically, the control section 22 controls driving of the image-processing section 16 and driving of the LCD 20. Further, the control section 22 issues a command to a motor drive circuit 26 which drives the lens drive motor 28, a drive motor placed in the shutter device 30, and the like, and controls operation of the lens groups 13a, 13b and operation of the shutter device 30, as well.

Figure 2:
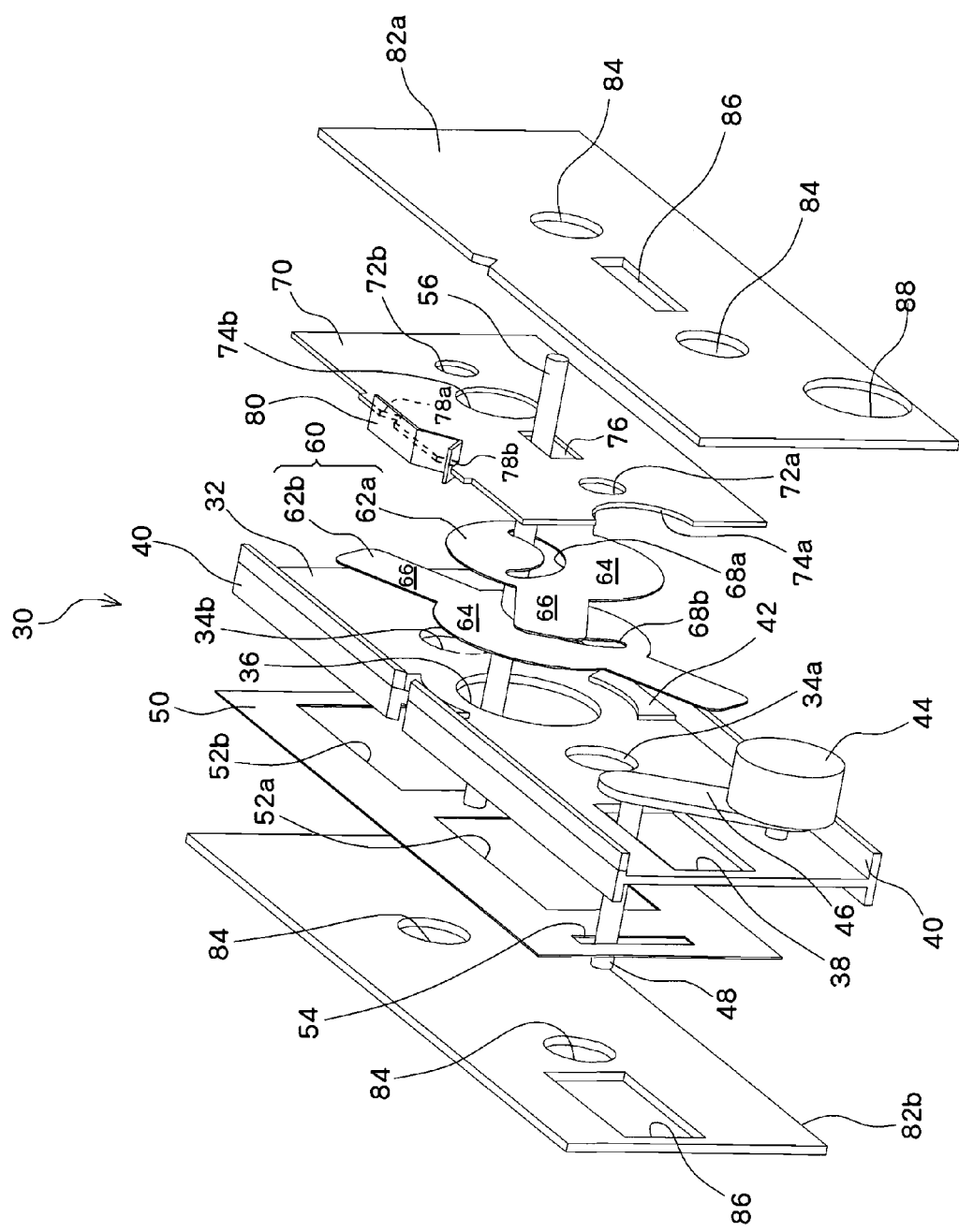
FIG. 2 is an exploded perspective view of a shutter device.

The shutter device 30 used in this digital camera 10 will now be described in detail. FIG. 2 is an exploded perspective view of the shutter device 30. As has been described previously, the shutter device 30 is a common unit into which a shutter mechanism and a diaphragm mechanism for each of the two image-capturing optical systems 12a, 12b are assembled. Namely, in a related-art camera having two image-capturing optical systems, each of the two image-capturing optical systems is equipped with a shutter mechanism and a diaphragm mechanism. However, provision of the shutter mechanism and the diaphragm mechanism to each of the image-capturing optical systems results in an increase in the number of drive motors and the space required by the mechanisms and the motors. An increase in the cost and overall size of the camera is consequently entailed. In order to solve the problems, the present embodiment uses the shutter device 30 that serves as a shutter mechanism and a diaphragm mechanism common to the two image-capturing optical systems 12a, 12b.

This shutter device 30 has a shutter base 32, a pair of shutter blades 60, a diaphragm plate 70, a move plate 50, and a housing (only a front 82a and a rear 82b of the housing are shown in FIG. 2). A first shutter opening 34a for permitting transmission of the subject light condensed by the first image-capturing optical system 12a and a second shutter opening 34b for permitting transmission of the subject light condensed by the second image-capturing optical system 12b are formed in the shutter base 32 with a predetermined interval therebetween. A first movement hole 36 which permits movement of a cam pin 56 to be described later is formed between the two shutter openings 34a, 34b. A second movement hole 38 for permitting movement of a move pin 48 is formed at the left of the first shutter opening 34a. The cam pin 56 and the move pin 48 respectively move within the ranges of the corresponding movement holes 36, 38. Consequently, the shutter base 32 does not make direct contact with the cam pin 56 and the move pin 48. Even when the cam pin 56 and the move pin 48 have moved, no change arises in the position of the shutter base 32.

An overhang section 40 which projects forward and rearward is formed along the upper edge and the lower edge of the shutter base 32. The overhang sections 40 act as guide members for guiding the moving direction of the diaphragm plate 70, which will be described later, and the move plate 50. A jutting section 42 whose profile matches the outer profile of the shutter blades 62a, 62b is formed at positions above and below the first movement hole 36. The shutter blades 62a, 62b are supported in a rotatable manner by means of the jutting sections 42.

The move plate 50 is provided on the back of the shutter base 32. The move plate 50 is a plate member which effects rectilinear translation in a lateral direction (a direction in which the two shutter openings 34a, 34b are adjacent to each other) by means of driving operation of the drive motor 44. The cam pin 56 is formed in a projecting manner at the essential center of the move plate 50. The cam pin 56 passes through the first movement hole 36 formed in the shutter base 32 and is inserted into cam holes 68a, 68b, and 76 formed in the shutter blades 62a, 62b, and a diaphragm plate 70. In association with movement of the move plate 50, the cam pin 56 effects rectilinear translation, whereupon the shutter blades 62a, 62b and the diaphragm plate 70 are actuated. In FIG. 2, the cam pin 56 is illustrated as being longer than actual size in order to show the position into which the cam pin 56 is inserted. The manner of movement of individual sections associated with movement of the cam pin 56 is described in detail later.

Transmission openings 52a, 52b are formed on respective sides of the cam pin 56 so as not to block the shutter openings 34a, 34b. In order to prevent blockage of the shutter openings 34a, 34b even when the move plate 50 has effected rectilinear translation, the transmission openings 52a, 52b are formed sufficiently larger than the shutter openings 34a, 34b.

An elongated hole 54 into which the move pin 48 is to be inserted is formed in the vicinity of the end of the move plate 50. The move pin 48 is provided at the extremity of a rotation arm 46 which is rotated by the drive motor 44. When the move pin 48 has effected circular-arc translation while remaining inserted into the elongated hole 54, vertical movement components of the move pin 48 are absorbed by the elongated hole 54, and horizontal movement components of the move pin 48 are transmitted to the move plate 50. As a result of transmission of the horizontal movement components to the move plate 50, rectilinear translation of the move plate 50 is implemented. The manner of translation of this move plate 50 will also be described in detail later.

The pair of shutter blades 60 are provided forward of the shutter base 32. The pair of shutter blades 60 simultaneously opens and closes the two shutter openings 34a, 34b, and is formed from the first shutter blade 62a and the second shutter blade 62b. Each of the shutter blades 62a, 62b has a blade section 66 which is sufficiently long to be essentially able to simultaneously block the two shutter openings 34a, 34b and a circular center section 64 provided at the center of the blade section 66. The cam holes 68a, 68b are essentially circular arcs and are formed in the center section 64. The shutter blades 62a, 62b are rotated as a result of translation of the cam pin 56 inserted into the cam holes 68a, 68b. By means of rotation of the shutter blades 62a and 62b, the angle of the blade section 66 is varied, to thus implement opening and closing of the shutter openings 34a and 34b.

The diaphragm plate 70 is disposed forward of the pair of shutter blades 60. Two small diaphragm openings 72a, 72b and two open diaphragm openings 74a, 74b are formed in the diaphragm plate 70. The two small diaphragm openings 72a, 72b are circular openings which are smaller than the corresponding shutter openings 34a, 34b. An interval at which the two small diaphragm openings are adjacent to each other is equal to the interval at which the two shutter openings 34a, 34b are adjacent to each other. When these two small diaphragm openings 72a, 72b are located in front of the corresponding shutter openings 34a, 34b, portions of the shutter openings 34a, 34b are blocked by the diaphragm plate, whereby the diaphragm becomes narrow.

Meanwhile, of the two open diaphragm openings 74a and 74b, the second open diaphragm opening 74b corresponding to the second shutter opening 34b is a circular aperture formed at the left of the second small diaphragm opening 72b. Further, the first open diaphragm opening 74a corresponding to the first shutter opening 34a is a semicircular cutout formed in the left side edge of the diaphragm plate 70. The interval at which the two open diaphragm openings 74a, 74b are adjacent to each other is equal to the interval at which the two shutter openings 34a, 34b are adjacent to each other. When the two open diaphragm openings 74a, 74b are located in front of the corresponding shutter openings 34a, 34b, the shutter openings 34a, 34b are not blocked by the diaphragm plate 70 and hence become opened. In the present embodiment, the reason why the open diaphragm opening 74a is formed into a cutout is to reduce the lateral length of the diaphragm plate 70 to thereby miniaturize the shutter device 30.

The cam hole 76 into which the cam pin 56 is inserted is formed between the second open diaphragm opening 74b and the first small diaphragm opening 72a. The cam hole 76 is essentially rectangular and elongated in the lateral direction; namely, in the moving direction of the cam pin 56. When the cam pin 56 has effected lateral rectilinear translation over a distance equal to or greater than the lateral length of the cam hole 76, the diaphragm plate 70 is pushed by the cam pin 56 to thus effect lateral rectilinear translation.

Two V-shaped grooves 78a, 78b which are to engage with a click body 80 are formed at a given interval in the upper end of the diaphragm plate 70. The click body 80 functions as a stop position regulatory member for regulating the stop position of the diaphragm plate 70 which moves in the lateral direction, and assumes a shape which enables engagement with the V-shaped grooves 78a, 78b. As a result of the click body engaging with the V-shaped grooves 78a, 78b, the stop position of the diaphragm plate is regulated. The click body 80 possesses resilience which effects vertical deflection when the click body is imparted with a given force or greater as a result of movement of the diaphragm plate 70. The click body 80 is disengaged from the V-shaped grooves 78a, 78b by means of deflection, thereby allowing movement of the diaphragm plate 70.

The shutter base 32, the move plate 50, the pair of shutter blades 60, and the diaphragm plate 70 are incorporated into the housing to thus form a unit; namely, the shutter device 30. Transmission openings 84 intended to prevent blockage of the shutter openings 34a, 34b are formed in the front 82a and the back 82b of the housing, thereby allowing transmission of subject light. A move hole 86 used for allowing movement of the cam pin 56 and the move pin 48 and a motor hole 88 for allowing projection of the drive motor 44 are also formed in the front 82a and the back 82b. Thus, the housing is, in spite of reduced thickness thereof, configured to allow actuation of individual sections.

Figure 3:
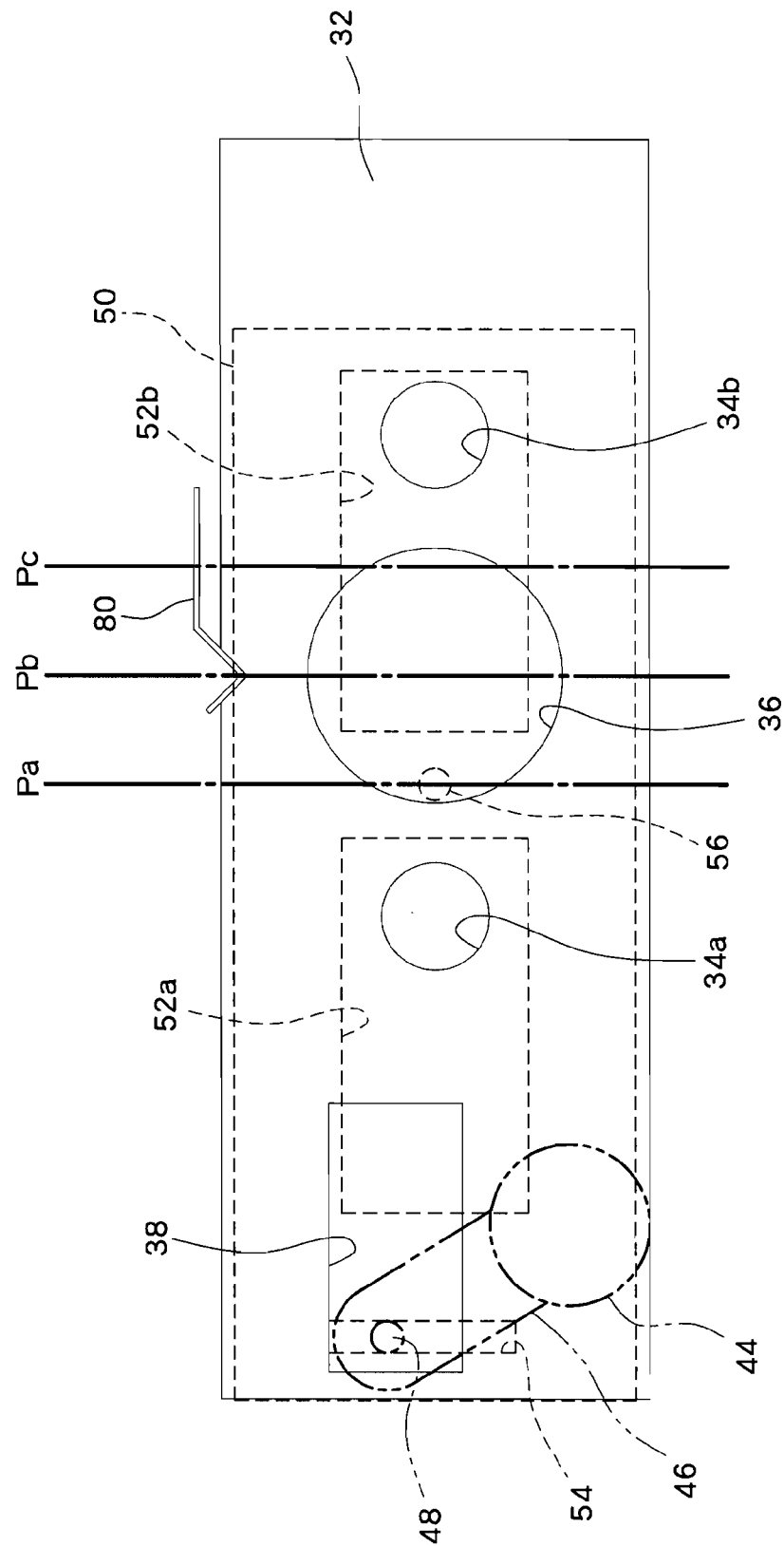
FIG. 3 is a general front view of a move plate and a shutter base achieved when a cam pin is located at the position of a start point.
Figure 4:
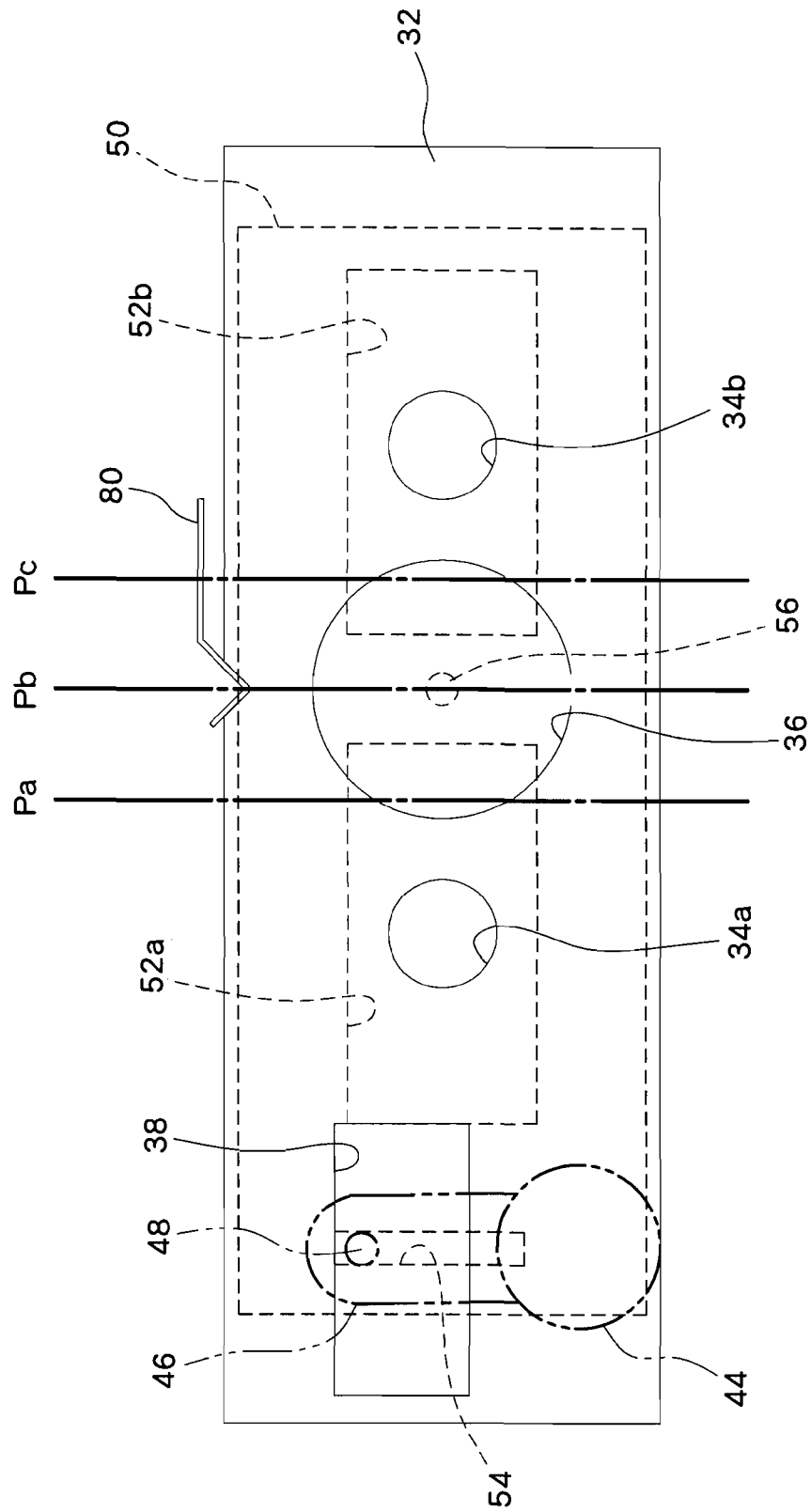
FIG. 4 is a general front view of a move plate and a shutter base achieved when a cam pin is located at an intermediate position.
Figure 5:
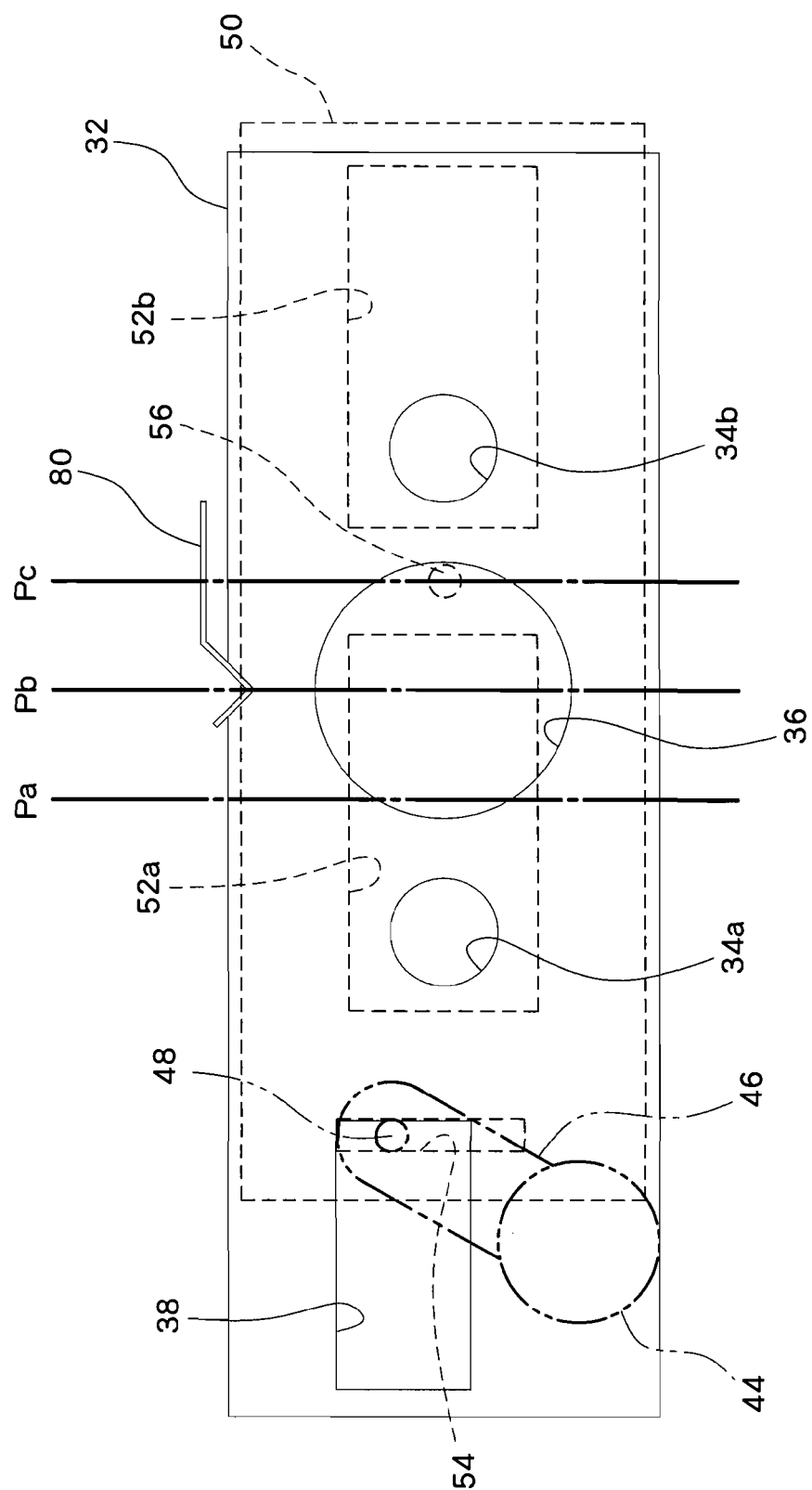
FIG. 5 is a general front view of a move plate and a shutter base achieved when a cam pin is located at the position of an end point.

Next, moving action of the cam pin 56 will be described in detail by reference to FIGS. 3 to 5. FIGS. 3 through 5 are general front views of the move plate 50 and the shutter base 32 achieved when the cam pin 56 is located at the position of a start point, an intermediate position, and the position of an end point. In FIGS. 3 through 5, the move plate 50 is denoted by a broken line, and the drive motor 44 and the rotary arm 46 are denoted by chain double-dashed lines.

In the present embodiment, the cam pin 56 linearly travels from the position of a start point Pa set close to the first shutter opening 34a to the position of an end point Pc set close to the second shutter opening 34b. During movement of the cam pin 56 from the start position Pa to the end position Pc, the cam pin passes by an intermediate position Pb set at an essentially-middle position between the start position Pa and the end position Pc.

Rectilinear translation of the cam pin 56 is realized by circular-arc movement of the move pin 48 as well as by rotation of the rotary arm 46. As mentioned previously, the move pin 48 is inserted into the elongated hole 54 formed in the vicinity of the end of the move plate 50.

When the cam pin 56 is located at the start position Pa; namely, at a leftward position, the move pin 48 is also located at a leftward position. When the rotary arm 46 is rotated clockwise from this state by means of driving operation of the drive motor 44, the move pin 48 is gradually moved rightward while plotting a circular-arc locus. At this time, vertical components of movement of the move pin 48 are absorbed by the elongated hole 54 that is elongated in the vertical direction. Meanwhile, lateral components of movement of the move pin 48 are transmitted to the move plate 50 without being absorbed by the elongated hole 54. Put another way, the move plate 50 is pushed rightward by the move pin 48, to thus effect rectilinear translation. Consequently, as shown in FIG. 4, the cam pin 56 provided in the move plate 50 is also moved rightward to thus reach the intermediate position Pb.

When the rotary arm 46 is rotated clockwise further, the move plate 50 and, by extension, the cam pin 56 are moved rightward further. As shown in FIG. 5, the cam pin 56 reaches the end position Pc. In the meantime, when the drive motor 44 is reversely rotated, to thus rotate the rotary arm 46 counter-clockwise from the state shown in FIG. 5, the cam pin 56 moves from the end position Pc to the start position Pa by way of the intermediate position Pb.

As is obvious from FIGS. 3 through 5, even when the cam pin 56 is located at any position along the way from the start position Pa to the end position Pc, the move plate 50 does not block the shutter openings 34a, 34b. Specifically, the transmission openings 52a, 52b which are sufficiently larger than the shutter openings 34a, 34b are formed in the move plate 50. Even when the move plate 50 has effected rectilinear translation, the shutter openings 34a, 34b are located within ranges of the transmission openings 52a, 52b.

The manner of actuation of the pair of shutter blades 60 stemming from movement of the cam pin 56 will now be described by reference to FIGS. 6 and 7. FIGS. 6 and 7 are general front views of the shutter openings 34a, 34b and the pair of shutter blades 60. In FIGS. 6 and 7, for the sake of clarity, the second shutter blade 62b is denoted by a broken line, and the shutter openings 34a, 34b are illustrated by chain double-dashed lines.

Figure 6A:
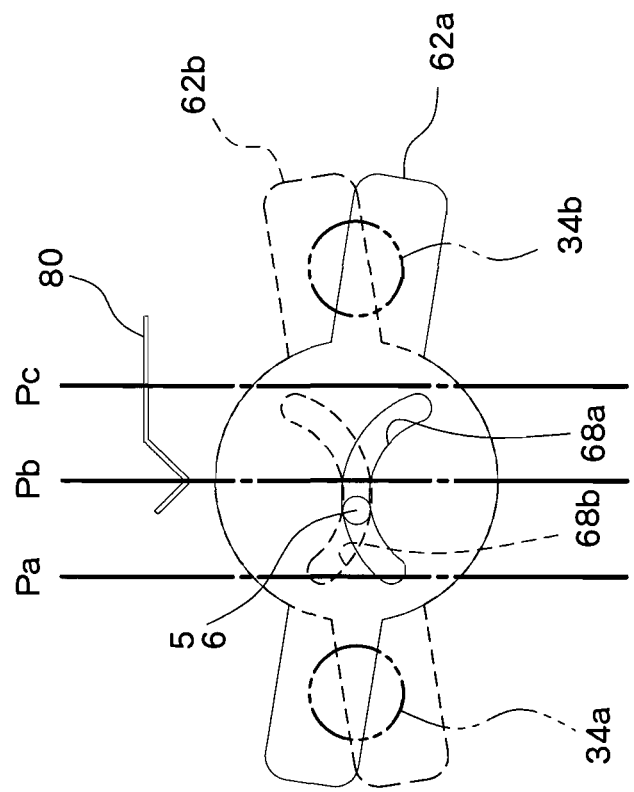
FIG. 6A is a general front view of shutter openings and a pair of shutter blades when a cam pin is located at the start position.

As shown in FIG. 6A, when the cam pin 56 is located at the start position Pa, the cam pin 56 is located in the vicinity of the edges of the cam holes 68a, 68b of the shutter blades 62a, 62b. At this time, an angle made between the two shutter blades 62a, 62b is great, and the two shutter openings 34a, 34b are opened.

Figure 6B:
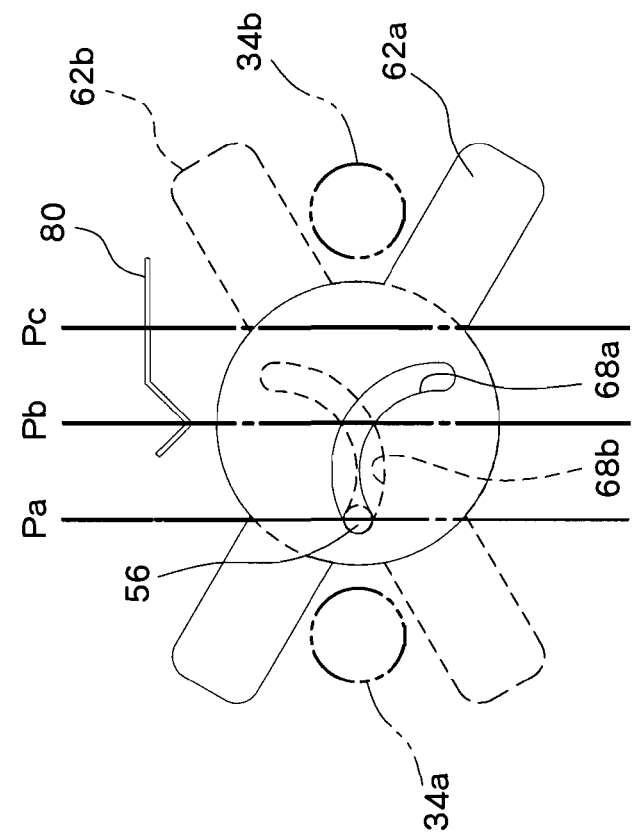
FIG. 6B is a general front view of shutter openings and a pair of shutter blades when the cam pin is located in the vicinity of the intermediate position.

When the cam pin 56 is moved toward the intermediate position Pb (rightward) from this state, the postures of the cam holes 68a, 68b and, by extension, the postures of the shutter blades 62a, 62b are gradually changed so as to maintain the inserted state of the cam pin 56. Specifically, the two shutter blades 62a, 62b are gradually rotated such that the angle made between the shutter blades becomes smaller. As shown in FIG. 6B, when the cam pin 56 has moved to the neighborhood of the intermediate position Pb, the two shutter openings 34a, 34b are completely blocked and closed by the two shutter blades 62a, 62b.

When the cam pin 56 is again moved to the start position Pa from this state, the state shown in FIG. 6A; namely, the state where the two shutter openings 34a, 34b are opened, is again attained. Specifically, as a result of reciprocal movement of the cam pin 56 from the start position Pa to the intermediate position Pb, opening and closing of the two shutter openings 34a, 34b are implemented.

Figure 7A:
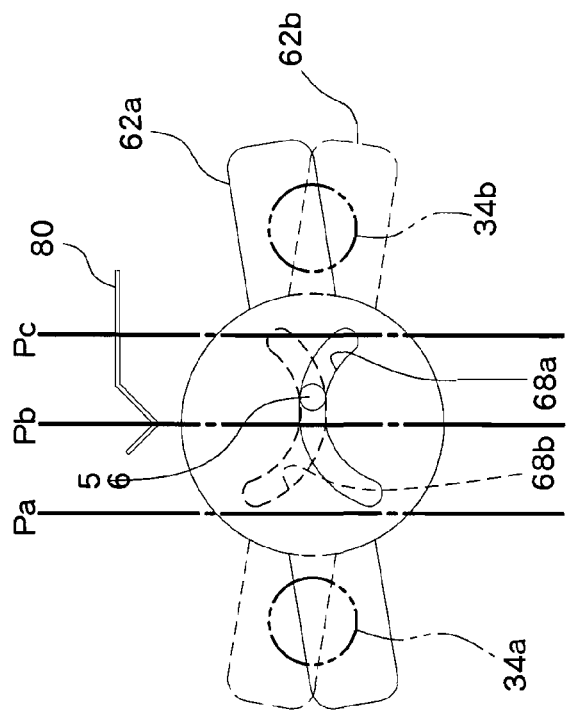
FIG. 7A is a general front view of the shutter openings and the pair of shutter blades when the cam pin is located at the end position.
Figure 7B:
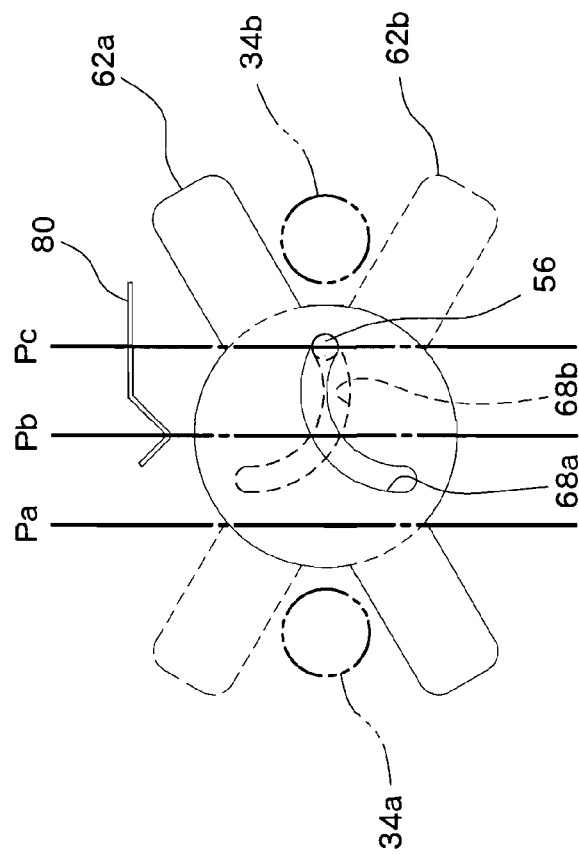
FIG. 7B is a general front view of the shutter openings and the pair of shutter blades when the cam pin is located at the intermediate position.

Consideration is given to a case where the cam pin 56 is further moved toward the end position Pc (rightward) from the state shown in FIG. 6B. In this case, when the cam pin 56 has exceeded the intermediate position Pb, the angle made between the two shutter blades 62a, 62b becomes gradually larger. When the cam pin 56 has reached the end position Pc, the angle made between the two shutter blades 62a, 62b becomes sufficiently large, as shown in FIG. 7A. Thus, the two shutter openings 34a, 34b become opened. When the cam pin 56 is again moved from this state toward the intermediate position Pb (leftward), the angle made between the two shutter blades 62a, 62b becomes gradually smaller. As shown in FIG. 7B, at a point in time when the cam pin 56 has reached the neighborhood of the intermediate position Pb, the two shutter openings 34a, 34b are completely blocked and closed. Put another way, as a result of reciprocal movement of the cam pin 56 from the intermediate position Pb to the end position Pc, opening and closing of the two shutter openings 34a, 34b are realized.

As is evident from the above descriptions, in the present embodiment, the cam pin 56 is reciprocally moved from the start position Pa to the intermediate position Pb or from the intermediate position Pb to the end position Pc, whereby opening and closing of the two shutter openings 34a, 34b are performed.

Figure 9B:
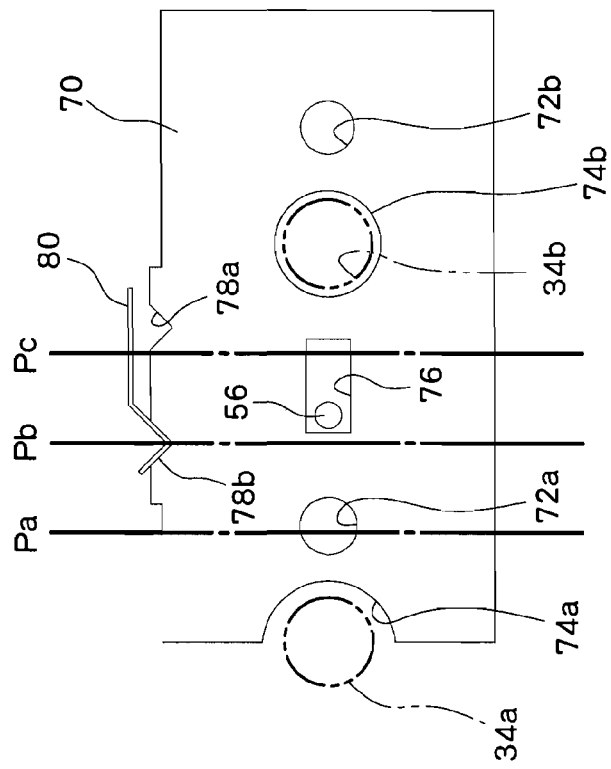
FIG. 9B is a general front view of the shutter openings and the diaphragm plate when the cam pin is located at the intermediate position.

The manner of actuation of the diaphragm plate 70 stemming from movement of the cam pin 56 will now be described by reference to FIGS. 8 and 9. FIGS. 8 and 9 are general front views of the shutter openings 34a, 34b and the diaphragm plate 70. In FIGS. 8 and 9, the shutter openings 34a, 34b are denoted by chain double-dashed lines.

First, the size of the cam hole 76 formed in the diaphragm plate 70 will be briefly described. As mentioned previously, the cam hole 76 of the diaphragm hole assumes a horizontally-elongated rectangular shape. The lateral length of the cam hole 76 is slightly shorter than the distance from the start position Pa to the intermediate position Pb or the distance from the intermediate position Pb to the end position Pc.

FIG. 8A shows a state achieved when the cam pin 56 inserted into the cam hole 76 is located at the start position Pa. In this case, the diaphragm plate 70 is located at a position where the two small diaphragm openings 72a, 72b are located in front of the two shutter openings 34a, 34b. The left side edge of the cam hole 76 of the diaphragm plate 70 is located in the vicinity of the cam pin 56, and the right side edge of the same is located slightly closer to the start position Pa (leftward) than to the intermediate position Pb. Moreover, the click body 80 is engaged with the first V-shaped groove 78a formed in a rightward position on the upper edge of the diaphragm plate 70.

Consideration is given to the case where the cam pin 56 is gradually moved toward the intermediate position Pb (rightward) from this state. In this case, as shown in FIG. 8B, even when the cam pin 56 has been moved to the neighborhood of the intermediate position Pb, the cam pin 56 does not contact the diaphragm plate 70. Therefore, even when the cam pin 56 has moved to the neighborhood of the intermediate position Pb, the diaphragm plate 70 remains stationary, and the two small diaphragm openings 72a, 72b remain located in front of the two shutter openings 34a, 34b.

When the cam pin 56 has been moved from the state shown in FIG. 8B; namely, the state where the cam pin 56 is located slightly closer to the start position Pa (leftward) than to the intermediate position Pb, further toward the end position (rightward), the diaphragm plate 70 is pushed by the cam pin 56, to thus attempt to move toward the end position Pc. At this time, movement of the diaphragm plate 70 is regulated to a certain extent by the click body 80 that engages with the first V-shaped groove 78a. However, when a predetermined force or greater is imparted to the click body 80 from the diaphragm plate 70, vertical deflection arises in the click body 80. By means of deflection, the click body 80 is disengaged from the first V-shaped groove 78a, thereby allowing movement of the diaphragm plate 70.

Figure 9A:
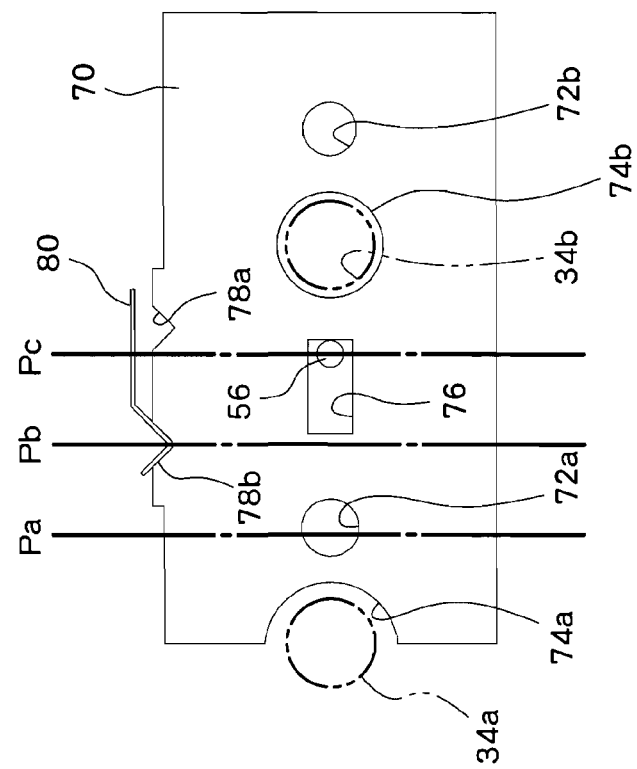
FIG. 9A is a general front view of the shutter openings and the diaphragm plate when the cam pin is located at the end position.

FIG. 9A shows a state where the cam pin 56 has reached the end position Pc while pushing the right end face of the cam hole 76. As is obvious from FIG. 9A, when the cam pin 56 has reached the end position Pc, the two open diaphragm openings 74a, 74b formed in the diaphragm plate 70 are located in front of the corresponding shutter openings 34a, 34b. Namely, the diaphragm becomes opened. The click body 80 disengaged from the first V-shaped groove 78a engages with the second V-shaped groove 78b. As a result, further movement of the diaphragm plate 70 is regulated, whereby the relative positional relationship between the open diaphragm openings 74a, 74b and the shutter openings 34a, 34b is maintained.

When the cam pin 56 is situated at the end position Pc, the left side edge of the cam hole 76 is located slightly closer to the end position Pc (rightward) than to the intermediate position Pb. Consideration is given to a case where the cam pin 56 is moved toward the intermediate position Pb (leftward) from this state. In this case, the cam pin 56 does not contact the diaphragm plate 70 before moving to a position closer to the positions of the end point than to the intermediate position Pb, and hence the diaphragm plate 70 does not move. Accordingly, even when the cam pin 56 has reciprocally moved from the end position Pc to the neighborhood of the intermediate position Pb, the state of the diaphragm remains unchanged. In the meantime, when the cam pin 56 has moved in excess of the intermediate position Pb, the state of the diaphragm changes from the opened state to the narrow state.

As is clear from the above descriptions, according to the present embodiment, even when the cam pin 56 has been moved in excess of the intermediate position Pb, the state of the diaphragm can be switched. Put another way, the state of the diaphragm is not changed unless the range of movement of the cam pin 56 exceeds the intermediate position Pb. As mentioned previously, as a result of the cam pin 56 being reciprocally moved from the start position Pa to the intermediate position Pb or from the intermediate position Pb to the end position Pc; in other words, as a result of the cam pin 56 being reciprocally moved within a range where switching of the diaphragm does not arise, the pair of shutter blades 60 opens and closes the shutter. Therefore, opening and closing of the shutter can be performed without involvement of a change in the state of the diaphragm. Further, even after the state of the diaphragm has been changed, the shutter can be opened or closed while the state of the diaphragm achieved after switching is being maintained.

This will be briefly described by reference to FIGS. 10 and 11. FIGS. 10 and 11 are general front views of the shutter openings 34a, 34b, the diaphragm plate 70, and the pair of shutter blades 60, and show FIGS. 6, 7, 8, and 9, which have already been described, in an overlapping manner.

As shown in FIGS. 10A and 10B, when the cam pin 56 has moved from the start position Pa to the neighborhood of the intermediate position Pb, the two shutter blades 62a, 62b rotate in a direction where the angle made between the shutter blades becomes smaller, thereby blocking the shutter openings 34a, 34b. In the meantime, the diaphragm plate 70 does not contact the cam pin 56 at this time and hence remains stationary. Accordingly, the two small diaphragm openings 72a, 72b remain situated in front of the corresponding shutter openings 34a, 34b. Specifically, the shutter can be opened and closed with a narrow diaphragm, by means of reciprocally moving the cam pin 56 between the start position and the intermediate position.

Figure 11A:
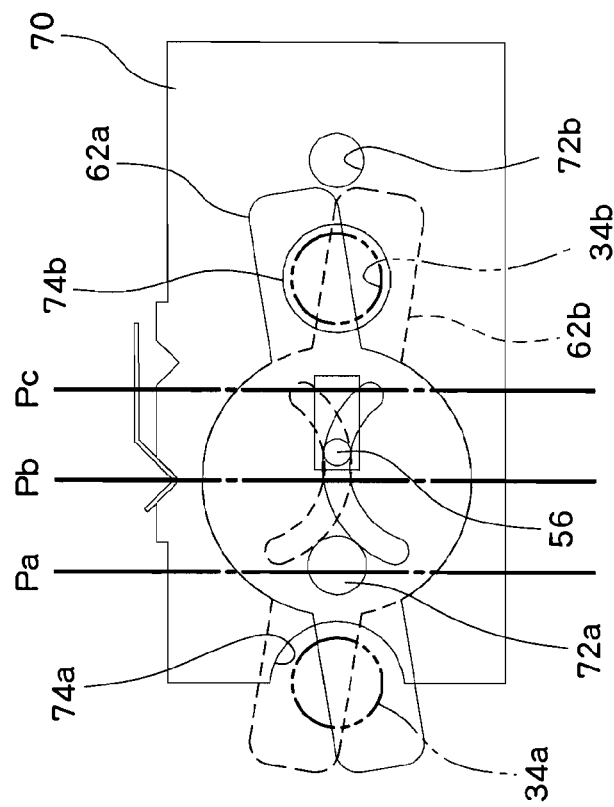
FIG. 11A is a general front view of the shutter openings, the diaphragm, and the pair of shutter blades when a cam pin is located at the end position.
Figure 11B:
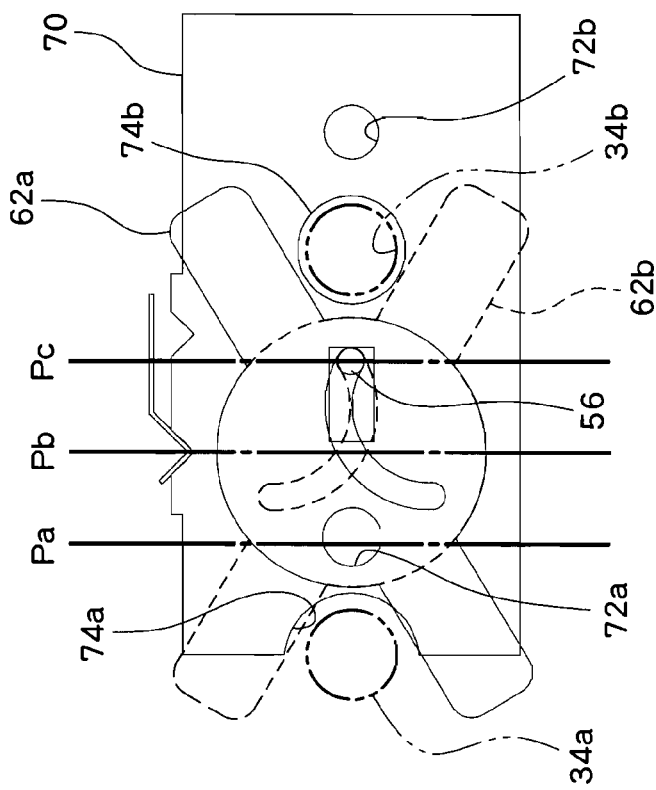
FIG. 11B is a general front view of the shutter openings, the diaphragm, and the pair of shutter blades when a cam pin is located at the intermediate position.

In the meantime, the cam pin 56 is moved to the end position Pc, so long as a command to switch the diaphragm from a narrow state to an open state is issued from the user or the like. When the cam pin 56 has been moved to the end position Pc, the diaphragm plate 70 is moved as shown in FIG. 11A. As a result, the two open diaphragm openings 74a, 74b come to the front of the corresponding shutter openings 34a, 34b, whereby the diaphragm becomes opened. When opening and closing of the shutter are desired in the state of the opened diaphragm, it is better to reciprocally move the cam pin 56 between the end position Pc and the intermediate position Pb, as shown in FIGS. 11A and 11B.

According to the present embodiment, operation for switching the state of the diaphragm and operation for opening and closing the shutter can be realized by means of adjusting the range of movement of the cam pin 56, as appropriate. The cam pin 56 moves upon receipt of an output from the single drive motor 44. Put another way, in the present embodiment, a single motor can switch the state of the diaphragm and to open and close the shutter. Consequently, as compared with the related-art technique requiring a plurality of motors, the present invention enables a reduction in the size and cost of a shutter device which opens and closes a shutter and switches a diaphragm.

The above-described shutter device is a mere example, and the shape, drive modes, and the like, of the shutter device may also be changed as needed. For instance, the moving direction of the cam pin 56, the direction in which the openings 72a, 72b, 74a, and 74b, all being formed in the diaphragm plate 70, are adjacent to each other, the shapes of the cam holes 76, 68a, and 68b formed in the diaphragm plate 70 and the shutter blades 62a, 62b, and the like, can be modified as necessary.

PARTS LIST 10 digital camera
12a optical systems
12b optical systems
13a lens groups
13b lens groups
14a CCDs
14b CCDs
16 image processing section
18 external memory
20 LCD
22 control section
24 user interface
26 motor drive circuit
28 drive motor 30 shutter device
32 shutter base
34a first shutter opening
34b second shutter opening
36 first movement hole
38 second movement hole
40 overhang section
42 jutting section
44 drive motor
46 rotation arm
48 move pin
50 move plate
52a transmission openings
52b transmission openings
54 elongated hole
56 cam pin
60 shutter blades
62a shutter blades
62b shutter blades
64 center section
66 blade section
68a cam holes
68b cam holes
70 diaphragm plate
72a small diaphragm openings
72b small diaphragm openings
74a open diaphragm openings
74b open diaphragm openings
76 cam holes
78a V-shaped grooves
78b V-shaped grooves
80 click body
82a front housing
82b rear housing
84 transmission openings
86 move hole
88 motor hole

What is claimed is:

1. A shutter device used in a camera having two image-capturing optical systems, the device comprising:
a shutter base having formed therein two shutter openings corresponding to the two image-capturing optical systems;
a shutter member capable of simultaneously opening and closing the two shutter openings;
a diaphragm plate having two open diaphragm openings and two small diaphragm openings formed therein; and
a cam pin which can reciprocally travel, upon receipt of driving force from a single motor, along a travel path extending from the position of a start point to the position of an end point via an intermediate position, wherein
a shutter cam hole into which the cam pin is to be inserted is formed in the shutter member, and the shutter cam hole defines actuation of the shutter member so as to perform each of opening and closing actions one or more times when the cam pin is reciprocally moved from the start position to the intermediate position and from the intermediate position to the end position; and
a diaphragm cam hole into which the cam pin is to be inserted is formed in the diaphragm plate, and the diaphragm cam hole defines actuation of the diaphragm plate such that the two open diaphragm openings are located in front of corresponding shutter openings when the cam pin is located at any location from the start position to the intermediate position, and such that the two small diaphragm openings are located in front of corresponding shutter openings when the cam pin is located at any position from the intermediate position to the end position.

2. The shutter device according to claim 1, wherein the shutter member has a pair of shutter blades which rotate to thus simultaneously open and close the two shutter openings; and
the shutter cam hole is formed in each of the shutter blades, and rotates the shutter blade in association with actuation of the cam pin.

3. The shutter device according to claim 1, wherein, when the cam pin effects rectilinear translation,
the open diaphragm openings and the small diaphragm openings are formed, in the diaphragm plate, adjacent to each other in the direction of movement of the cam pin; and
the diaphragm cam hole is an elongated hole which extends in the direction of movement of the cam pin and is slightly shorter than a distance from the start position to the intermediate position or a distance from the intermediate position to the end position.

4. The shutter device according to claim 3, wherein at least one of the two open diaphragm openings formed in the diaphragm plate is a cutout formed in an end portion of the diaphragm plate.

5. The shutter device according to claim 1, further comprising:
a stop position regulatory member which hinders movement of the diaphragm plate upon engagement with a portion of the diaphragm plate and is disengaged from the diaphragm plate by means of elastic deformation upon exposure to an addition of given force or greater; and
the diaphragm plate has a section to be engaged which engages with the engagement member when the two open diaphragm openings have moved to positions corresponding to the two shutter openings and the two small diaphragm openings have moved to the positions corresponding to the two shutter openings.

* * * * *